United States Patent [19]

Stoll

[11] Patent Number: 4,457,423
[45] Date of Patent: Jul. 3, 1984

[54] CONVEYOR SYSTEM

[76] Inventor: Kurt Stoll, Lenzhalde 72, 7300 Esslingen/N., Fed. Rep. of Germany

[21] Appl. No.: 264,528

[22] Filed: May 18, 1981

[30] Foreign Application Priority Data

Jun. 20, 1980 [DE] Fed. Rep. of Germany ....... 3023036

[51] Int. Cl.³ .................... B61B 13/12; B65G 19/18; B65G 35/00
[52] U.S. Cl. .................................. 198/619; 92/175; 104/154; 104/156; 310/103; 406/111; 414/751
[58] Field of Search ............... 104/154, 156; 92/128, 92/175; 198/619, 648; 310/103; 406/105, 111, 112, 191; 414/751

[56] References Cited

U.S. PATENT DOCUMENTS

| | | | |
|---|---|---|---|
| 943,329 | 12/1909 | Wolever | 406/191 X |
| 1,719,231 | 7/1929 | McLaren | 104/156 |
| 2,176,439 | 10/1939 | Taylor et al. | 406/191 |
| 3,248,071 | 4/1966 | Cook | 406/191 X |
| 3,779,401 | 12/1973 | Carroll | 414/751 |
| 3,882,791 | 5/1975 | Youngscap | 198/619 X |
| 4,305,448 | 12/1981 | Stoll | 92/175 X |
| 4,351,229 | 9/1982 | Stoll | 92/128 |
| 4,354,125 | 10/1982 | Stoll | 310/103 |

Primary Examiner—Howard Beltran
Attorney, Agent, or Firm—Flynn, Thiel, Boutell & Tanis

[57] ABSTRACT

A conveyor system is designed for moving loads along a curved path and takes the form of a guide pipe having within it a piston-like driver which may be shuttled from one end to the other thereof by forcing driving fluid, as for example water and oil, into the one end or the other end of the pipe. A sleeve-like runner is placed on the outside of the pipe and is joined up with the driver by a magnet system which may take the form of a magnetic driving part on the driver and so placed thereon as to be radially spaced from the inner wall face of the pipe. The driver within the pipe and the runner on the pipe, together with any magnet system on them, have outer and inner forms taking into account the curved forms of the pipe.

13 Claims, 4 Drawing Figures

CONVEYOR SYSTEM

FIELD OF THE INVENTION

The present invention relates to a conveyor system and more specially to a conveyor system of the sort having a curved pipe and a piston-like driver placed within it so that it may be moved therealong by a fluid. One example of such a conveyor system as used in the prior art is a pneumatic conveyor.

BACKGROUND OF THE INVENTION

Known systems are complex in design and for this reason high in price or they are limited, at least with respect to the size and/or the weight of the loads to be transported. A further shortcoming of known systems is their narrow field of use inasmuch as for example they may not be designed to be fully in harmony with the path along which the load is to be transported. On the other hand operation of such known systems is frequently complex. Generally it may be said that there is only a very limited number of cases in which such conveyor systems may be used within the teachings of the prior art.

SUMMARY OF THE INVENTION

One purpose of the present invention is that of taking care of these shortcomings and designing a system which while having a simple and low price design may readily be so made that it may be used for any desired purpose and may be worked in a very much larger field without being limited on the one hand by the path along which the load is to be moved and with respect to the size of the load to be transported.

For effecting this purpose and further purposes which will be made clear in the present specification the transporter system is made up of a guide pipe, shut off fluid-tightly at its two ends and curved so as to be in line with a curved transport path along which the loads are to be moved, the ends of the pipe having inlets and outlets, controlled by valves, for a pressure fluid as for example compressed air, water under pressure or, more especially, water mixed with oil, the pipe having sealingly placed within it a driver able to be shuttled backwards and forwards along the pipe under the effect of the fluid, the driver having a driving magnet system which is spaced radially clear of the inner face of the pipe and being designed for magnetically driving a magnet system in the form of a sleeve placed with a radial spacing on the pipe, such outer magnet system being joined up with a driver, or forming itself a driver, the driver having an outer form in agreement with the curved inner faces of the guide pipe and the outer runner having an inner face in agreement with the curved outer faces of the guide pipe so that the runner and the driver may be moved therealong.

One useful effect of the present invention is that the system may be used for moving loads along a curved path without any trouble conditions whatsoever, while on the other hand being generally low in price and giving a long working life. The structure of the system is simple and there is no limit to the size or the weight of the load to be transported. It may generally be said that the invention makes possible a simple transporter system with a large number of useful effects and which may be used for example for moving displays or curtains for round windows and furthermore for conveying systems within a works or in the home, for example if the working fluid is water or is the only possible fluid able to be used. In comparison with pneumatic conveyor systems as used in the prior art, the new system gives the useful effect that it is not limited with respect to the size of the load to be transported, it further offering the useful effect that water under pressure, that is to say tap water, may be much more readily used in the home that is the case with any other prior art system. In this case it is best for the guide pipe to be lined and coated on its outside with synthetic resin. The system may be so engineered that by using together straight conveyor system parts of the sort in question and curved parts, for example in the form of a letter Z or letter U, within a works or store it is possible for the system to be used for connection of the different floors of a building. If the guide pipe is made of thin material, it may be bent while it is being put in position for the first time so as to take into account the desired form of the transport path, and in this case the guide pipe, for example on its lower face, may have a stiffening rail, joined to it for example by welding or screws, having the same bent form as the guide pipe and with a cross-section of narrow form, for example in the form of a rectangle, with its longer sides pointing towards the middle of the cross-section of the guide pipe. In this case there is the one useful effect that the guide pipe may be bent to be fully in line with the curved transport path while on the other hand, while saving material (because it only has thin walls) may be made as stiff as is needed. In the case of a long transport path the guide pipe may be made up of a number of lengths of pipe, produced for example by drawing or the like, such lengths being joined together at their ends with outwardly and inwardly smooth joints which may be undone as needed, for example by using screw systems. For this purpose the one end of one pipe may have a male threaded part which is screwed into a female part on the other pipe, the two pipe ends being stepped in diameter to make this possible. If the two ends furthermore have stiffening rails the same may be joined together end to end, for example by way of fishplates or the like so as to give the function of a single-piece overall rail stretching right along the length of the pipes. If, more specially, the driver is in the form of a piston without a piston rod there will be the further useful effect that using normally-produced single pieces of pipe a conveyor system may be designed running along great lengths and completely trouble-free in operation; as for the design of the joints between such pipe lengths it is possible to make use of gasket rings therebetween so that the piston may be moved completely smoothly along the lengths of pipe. For building up the system it is only necessary to make use of single pieces of pipe as are normally mass produced. Generally speaking it is possible to make certain of a smooth inner pipe wall face over which the piston driver may be smoothly moved as it is pushed backwards and forwards from one end of the pipe to the other. For designing the piston driver so that it is better in line with curved parts of the pipe it may be made smaller in diameter at its middle than at its ends so that, for example, as seen in axial section the piston driver has inwardly curving outer faces, the piston furthermore having gland rings at its two axial ends, such gland rings being made of material elastically resting against the inner face of the pipes smoothly and completely for giving a fully liquid-tight seal. When designed on these lines the piston driver may be smoothly moved along the full length of the guide pipe without any trouble conditions such as any loss of the sealing connection with the pipe or the danger of the driver going into a skew position and jamming.

For stopping and positioning the piston driver at desired positions the driver may have a brake system, best designed as a friction brake, and designed to take effect in a way dependent on the pressure in the pipe and/or the position of the driver within the same, such brake being designed for the purpose of slowing down the driver in good time before coming into its desired station and then stopping it in the station in quite the right position, the brake system being joined up with a pressure transducer (joined up with the working space within the guide pipe and limited by the piston) whose output is joined up, for example, with a limit switch of threshold detector. Alternatively or in addition, the system may be controlled by a magnet field detector, placed on the outer side of the runner-magnet system and/or by a position pick-up put into operation when a valve (designed for controlling pressure within the pipe) goes into a neutral position. In this respect for example, the brake system may in the form of a brake rail running right along the guide pipe in its axial direction, and at least one brake part for use with the rail, the rail and the brake part working together when desired for producing the friction and braking effect. In the case of such a system the piston driver may be stopped right at the desired station, that is to say positioned, without any danger of trouble conditions and furthermore loads may be lifted, that is to say transported upwards, without any danger in the case of this form of operation.

Furthermore it may be generally said that the new system is very simple in design and may be made at a low price and furthermore in operation is very unlikely to be responsible for any trouble conditions.

DETAILED DESCRIPTION

Generally it may be said that the conveying and transporting system of the present invention, to be seen in the figures, is like a pneumatic conveying system inasmuch as loads are moved along a curved pipe, whose curves may be in the form of parts of circles, within a works or store so that the system may be used for the same purpose as prior art pneumatic conveyors. However, in a large number of respects, the conveyor system of the present invention is more useful than known pneumatic conveyor systems, last but not least because it is not limited with respect to the size and/or the weight of the goods to be transported.

Figure 1:
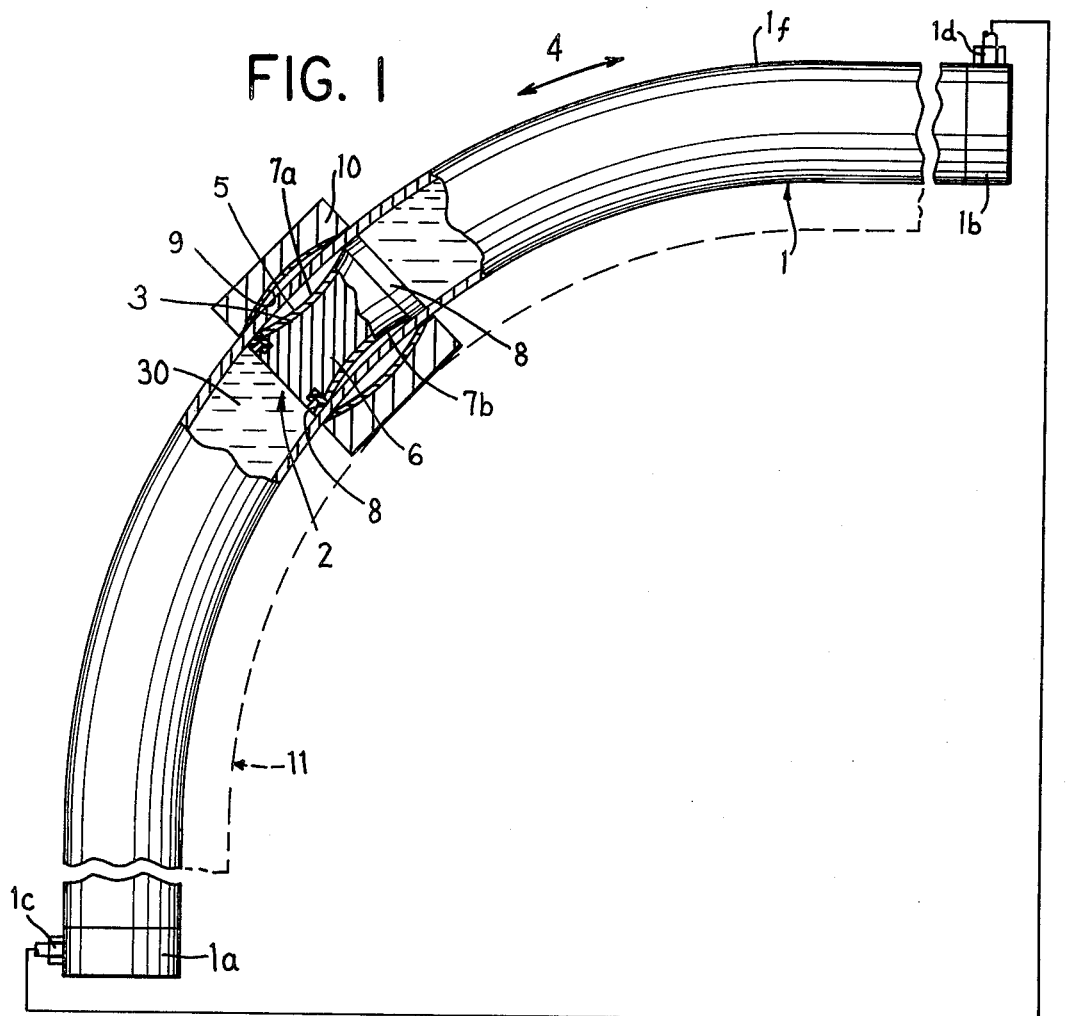
FIG. 1 is a fragmentary sectional side view of a transport or conveying system of the present invention.

As will be seen from FIG. 1 the transporting and conveying system of the present invention is made up of a guide pipe 1 which may be thin-walled and made of nonmagnetic material such as brass or the like, the pipe running along a curved path whose curves may for example be parts of circles. This guide pipe is sealed off fluid-tightly at its two ends, its end pieces 1a and 1b used for this purpose best being made of aluminum. The pipe has inlets and outlets 1c and 1d for a driving fluid 30 as for example compressed air, water under pressure or a mixture of oil and water, such fluid being supplied by a pressurized fluid source 1g and controlled by a control valve arrangement 1e so that the guide pipe is in some respects like a piston-cylinder actuator as used in hydraulic and pneumatic systems. The control valve arrangement 1e is a conventional arrangement such as that disclosed in U.S. Pat. No. 3,779,401 and is therefore not described in detail. The guide pipe may furthermore be lined as at 1m (FIG. 4) and, if desired, coated as at 1n on its outer side 1f with synthetic resin, if for example the pressure fluid is water, as well may be the case in a conveying system designed for use in the home, where it will be cheaper than compressed air if the apparatus for producing compressed air is taken into account. Within the guide pipe there is a driver 2 acted upon by the fluid and shuttled somewhat like a piston from one end of the pipe to the other, the driver being glanded at 8 for making a fluid-tight seal with the inner face of the pipe. The driver may be made for example of aluminum. Driver 2 has an inner magnet system 3 fixed to it and spaced radially from the inner face of the pipe. Generally it may be said that the driver takes the form of a piston without a piston rod and can be shuttled within guide pipe 1 as marked by arrows 4 under the effect of the fluid. It will be seen that the outer face 5 of this rod-less piston driver is made narrower in its middle part 6 or, putting it somewhat differently, when looked at in axial section it will be seen that the piston outer face 5 is one answering to inwardly curved lines 7a and 7b so that the piston driver with its driving magnet system 3 has a concave arcuate outer form in line with the inner face of the guide pipe at the curves so that there is no chance of the end faces of the driver being jammed against the inner face of the pipe 1 as the piston driver is on its way therealong. The piston driver has, as noted, ring-like glands or seals 8 at its two axial ends for making good contact with the inner face of the pipe, the material of the glands being elastic so as to be kept completely in contact with the inner pipe face without any chance of trouble conditions in operation of the system. The inner magnet system 3, which is joined with the piston driver, is used for driving a sleeve-like or ring-like outer magnet system 9 which again is guided so as to be radially spaced from the outer face of the pipe, the outer magnet system being opposite to the inner magnet system and being joined up with a runner 10 designed for supporting the load and whose design will in detail be dependent on the special purpose for which the system is engineered. In place of having a separate magnet system 9 and runner 10, the runner 10 itself may be made magnetic. The outer structure or runner furthermore has a concave arcuate inner form designed to be in harmony with the curved form of the guide pipe so that the runner may be smoothly moved along curved parts of the pipe by the driver. The design will be such in this respect that on letting in pressure fluid, for example from the lower or left hand end of the pipe 1 in the FIG. 1, the piston driver 2 will be moved, under the effect of the pressure fluid, to the right in the figure, its speed being dependent on the pressure of the moving fluid, which will be in line with adjustments made to the system. Because the inner magnet system 3 and the outer magnet system 9 (which may be in the form of radially polarized magnets) are magnetically coupled, the runner 10 is moved by the driver 2 together with its load so that the load may be moved as desired, the line of motion being curved at least in parts.

Figure 3:
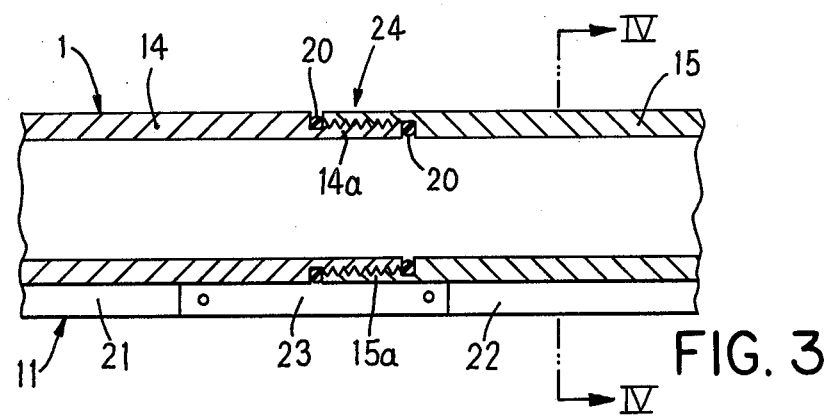
FIG. 3 is a sectional side view of a pipe which is a component of the system of FIG. 2.

The guide pipe 1 may be made with a long length simply using normally produced pipes which at the present day may have a length of 3-4 meters. For this purpose the pipe is made up of a number of separate lengths of pipe, for example the lengths 14 and 15 shown in FIG. 3, joined together steplessly, that is to say smoothly, while at the same time making certain of a completely fluid-tight joint in each case. These lengths of pipe may be so joined that they may be undone again and in this case the joints may be screw joints, as at 24, with gasket rings 20 therebetween. For this purpose the connections between the lengths 14 and 15 of pipe may be made by stepping the ends of the lengths so that the inner or smaller-diameter step 14a at the end of one pipe taking the form of a spigot may be threadedly engaged in the larger-diameter end 15 of the other length of pipe which then takes the form of a bell. If the lengths of pipe so produced are long in length so that there is a danger of sagging, stiffening rails 11 may be fixed, for example by welding or by screws, to the lower faces of the pipes as will be seen marked in broken lines in FIG. 1.

Figure 4:
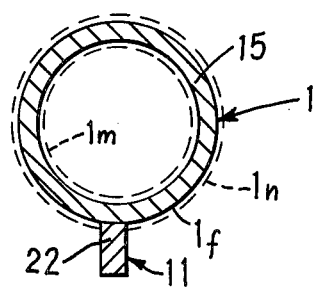
FIG. 4 is a sectional view taken along line IV—IV in FIG. 3.

In this case the outer runner 10 or magnet system 9 has to have a cutout to receive the stiffening rail 11, which is bent in a curved form at positions where the guide pipe is curved. Such a rail may have a narrow cross-section, for example in the form of a narrow rectangle or the like, as shown in FIG. 4, with its long sides pointing towards the middle of the guide pipe. In other words, the rail 11 projects generally radially outwardly from the pipe 1. In the case of a system in which a number of single lengths of pipe are joined together for producing a very long guide pipe the single lengths may each have a single guide rail, as at 21 and 22 in FIG. 3 their axial ends being joined together, for example using fishplates 23 or the like so that they may be undone again, the lengths and rails when so joined together forming one guide pipe functioning as if it were made in one single piece.

For exactly positioning the moving part of the system and for stopping any blows and kicks when the moving system, that is to say the driver and the runner, comes to the end of the pipe, the driver may have a brake system acting as a friction brake and which takes effect in a way dependent on the pressure level inside the guide pipe and/or the position of the driver for slowing down the driver in good time before it comes to the station where it is to be stopped and kept in its stop position by the brake. The brake system is not detailed in the figure but it may take the form of a brake rail, stretching along the axial length of the pipe, for example along its full length, and at least one brake shoe for use with the rail, the brake shoe and the rail being worked together for producing the friction or braking effect. The brake system may be put into operation by a pressure transducer acted upon by the pressure in the working space walled in by the guide pipe and the driver and which has its output joined, for example, with a level switch or level detector. Furthermore, in place of the system, the brake system may be put into operation by a magnet field detector placed at the top end of the outer magnet system or by a pick-up which is put into operation when the valve controlling the pressure in the pipe goes into a neutral position. In this way the brake system may be controlled by the pressure produced in the guide pipe or may be controlled by the position of the driver within the guide pipe.

Figure 2:
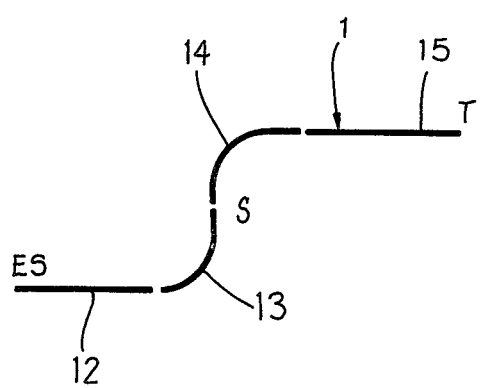
FIG. 2 is a view of a conveying system for use within a works and made up using the system parts to be seen in FIG. 1.

FIG. 2 is a view of a conveyor system used within a works or store and designed for transporting a load, for example from the first floor ES through the second floor S to the third floor T. This works conveyor system, which as desired may be run with compressed air or with water under pressure, is made up using the parts to be seen in FIG. 1 and may have for example a straight guide pipe 12, a curved guide pipe 13 joined therewith and designed generally on the lines of FIG. 1. There is then a further curved guide pipe 14 which may be designed on the same lines as pipe 13 and then again there is a straight guide pipe 15, such guide pipe lengths being joined together as noted earlier in the present specification in such a way that the driver may be moved smoothly over the joints without any trouble conditions such as jamming of the ends of the driver against the inner face of the pipe in the curved parts of the same, the braking system being especially important in this form of the invention.

The embodiments of the invention in which an exclusive property or privilege is claimed are defined as follows:

1. A conveyor system, comprising a pipe which is made of a nonmagnetic material and has a curved portion, an inner surface, an outer surface and two ends; a piston axially slidably disposed within said pipe, sealing engaging said inner surface of said pipe, and including first magnetic means; means for effecting a fluid-tight seal at each of said ends of said pipe; means for selectively supplying fluid to and removing fluid from said pipe on opposite sides of said piston to effect reciprocal movement of said piston within said pipe lengthwise thereof; a runner slidably supported on said outer surface of said pipe for axial movement with respect to said pipe and including second magnetic means, said first and second magnetic means magnetically coupling said piston and said runner so that said runner moves axially of said pipe with said piston; and means for facilitating movement of said piston and said runner along said curved portion of said pipe, including an outer surface on said piston which faces said inner surface of said pipe and an inner surface on said runner which faces said outer surface of said pipe, said outer surface on said piston and said inner surface on said runner each having a profile, in an axial direction, which is concave and arcuate.

2. the system of claim 1, wherein said piston has two spaced annular glands which are each located at a respective axial end thereof and sealingly slidably engage said inner surface of said pipe; and wherein said concave arcuate outer surface on said piston is an annular surface which extends between said annular glands and has a minimum outside diameter at a location approximately intermediate said annular glands.

3. A conveyor system, comprising a pipe having a curved portion and two ends, a piston disposed within said pipe and sealingly slidably engaging an inner surface thereof, means for sealing each said end of said pipe, means for selectively supplying fluid to and removing fluid from said pipe on opposite sides of said piston to effect reciprocal movement of said piston within said pipe lengthwise thereof, and a runner slidably supported on an outer surface of said pipe for movement lengthwise thereof, said piston and said runner being drivingly coupled by magnetic means which produces a magnetic attraction therebetween, said piston having an outer surface and said runner having an inner surface, said outer surface of said piston and said inner surface of said runner each having a profile, in an axial direction, which is concave and arcuate, thereby facilitating movement of said piston and said runner along said curved portion of said pipe.

4. The system of claim 3 wherein said magnetic means includes said runner having means for producing a magnetic field.

5. The system of claim 3, wherein said fluid is a mixture of water and oil.

6. The system of claim 3, wherein said pipe is made of a nonmagnetic material, and wherein said means for sealing each said end of said pipe includes two end pieces, each said end piece sealingly closing a respective one of said ends of said pipe.

7. The system of claim 3, wherein a portion of said piston is made of aluminum.

8. The system of claim 3, wherein said piston has at each axial end thereof an annular gland which sealingly slidably engages said inner surface of said pipe.

9. The system of claim 3, wherein said inner surface of said pipe is coated with a synthetic resin.

10. The system of claim 9, wherein said outer surface of said pipe is coated with a synthetic resin.

11. The system of claim 3, including a stiffening rail secured to and extending along said pipe, said rail projecting generally radially outwardly from said outer surface of said pipe.

12. The system of claim 11, wherein said pipe includes first and second pipe sections which each have a stepped end, said stepped end of said first pipe section being a male part having an outside diameter less than the diameter of said outer surface of said pipe and said stepped end of said second pipe section being a female part having an inside diameter greater than the diameter of said inner surface of said pipe, said stepped end of said first pipe section being received in said stepped end of said second pipe section and said inner and said outer surfaces of said pipe being substantially smooth and continuous in the region of said stepped ends of said first and second pipe sections, and wherein said stiffening rail includes first and second sections which are respectively secured to and extend along said first and second pipe sections and which respectively have first and second ends which are located in the region of said stepped ends of said pipe sections and butt against each other.

13. The system of claim 12, including a fishplate extending between and disposed against said first and second ends of said stiffening rail sections and means securing said fishplate to said stiffening rail sections.

* * * * *